(12) United States Patent
Yasuda et al.

(10) Patent No.: US 8,432,486 B2
(45) Date of Patent: Apr. 30, 2013

(54) HEAT DISSIPATING STRUCTURE FOR AN IMAGING UNIT

(75) Inventors: Koji Yasuda, Osaka (JP); Masanao Wakikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 227 days.

(21) Appl. No.: 13/023,471

(22) Filed: Feb. 8, 2011

(65) Prior Publication Data

US 2011/0234892 A1     Sep. 29, 2011

(30) Foreign Application Priority Data

Mar. 25, 2010  (JP) ................................ 2010-069598
Oct. 22, 2010  (JP) ................................ 2010-237286

(51) Int. Cl.
   *H04N 5/225*     (2006.01)
(52) U.S. Cl.
   USPC ........................................ 348/374; 348/373
(58) Field of Classification Search .................. 348/373, 348/374
   See application file for complete search history.

(56) References Cited

U.S. PATENT DOCUMENTS

| | | | | |
|---|---|---|---|---|
| 2006/0256199 | A1* | 11/2006 | Takahashi et al. | 348/207.99 |
| 2007/0109747 | A1* | 5/2007 | Sengoku et al. | 361/714 |
| 2008/0014482 | A1* | 1/2008 | Yamamiya | 429/19 |
| 2008/0316344 | A1* | 12/2008 | Yamamiya | 348/294 |
| 2009/0153684 | A1 | 6/2009 | Yoshida et al. | |
| 2009/0237537 | A1* | 9/2009 | Maruyama et al. | 348/294 |
| 2010/0061716 | A1* | 3/2010 | Iyoda et al. | 396/535 |
| 2011/0267535 | A1* | 11/2011 | Seo et al. | 348/374 |

FOREIGN PATENT DOCUMENTS

| | | |
|---|---|---|
| JP | S61-128875 U | 8/1986 |
| JP | S62-12897 U | 1/1987 |
| JP | 2005-252547 A | 9/2005 |
| JP | 2006-157254 A | 6/2006 |
| JP | 2006-211091 A | 8/2006 |
| JP | 2006-251058 A | 9/2006 |
| JP | 2008-306303 A | 12/2008 |
| JP | 2009-147685 A | 7/2009 |
| JP | 2010204242 A * | 9/2010 |

* cited by examiner

*Primary Examiner* — Tuan Ho
*Assistant Examiner* — Zhenzhen Wu
(74) *Attorney, Agent, or Firm* — Shinjyu Global IP

(57) ABSTRACT

A heat dissipating structure for an imaging unit includes an imaging element configured to convert light into an electrical signal, a first heat dissipating plate, a second heat dissipating plate, and a heat dissipating portion. The first heat dissipating plate has a first end and a second end disposed opposite to the first end, and is positioned on the rear face side of the imaging element. The second heat dissipating plate is positioned on the rear face side of the first heat dissipating plate. The heat dissipating portion is fixedly coupled to the first end of the second heat dissipating plate.

15 Claims, 10 Drawing Sheets

HEAT DISSIPATING STRUCTURE FOR AN IMAGING UNIT

CROSS-REFERENCE TO RELATED APPLICATIONS

This application claims priority under 35 U.S.C. §119 to Japanese Patent Application No. 2010-069598, filed on Mar. 25, 2010, and Japanese Patent Application No. 2010-237286, filed on Oct. 22, 2010. The entire disclosures of Japanese Patent Applications No. 2010-069598 and No. 2010-237286 are hereby incorporated herein by reference.

BACKGROUND

1. Technical Field

The technology disclosed herein is related to a heat dissipating structure for an imaging unit.

2. Background Information

The amount of heat generated by an imaging element rises as the imaging element becomes larger and as the number of pixels increases. Also, there is a need for still cameras such as digital still cameras to have a moving picture capture function as well, and this leads to more heat being generated by imaging elements.

Also, there is a move toward higher integration and higher driver frequencies in control IC chips and signal processing IC chips for processing and recording high-definition image data or moving picture data. Therefore, heat generation from these IC chips cannot be ignored, either.

As things stand, however, the need for making imaging devices smaller and thinner continues unabated. Therefore, the problem of heat generation with these imaging devices must be solved without making the devices themselves any larger.

In view of this, a variety of heat dissipating structures have been proposed. For example, Japanese Laid-Open Utility Model Application S61-128875 discloses a heat dissipating apparatus for a charge-coupled device. Japanese Laid-Open Utility Model Application S62-12897 discloses a heat dissipating apparatus for a camera. With these heat dissipating apparatuses, a heat dissipating plate is attached to the rear face of an imaging element. Also, Japanese Laid-Open Patent Application 2006-211091 discloses a heat dissipating structure for an imaging element. With this heat dissipating structure, a heat dissipating plate and a heat dissipating element are connected by a heat dissipating path provided to the heat dissipating plate.

However, because the amount of heat generated by imaging elements is increasing, and because there are heat generation sources other than imaging elements, such as control IC chips and signal processing IC chips, there are situations in which it is difficult to disperse heat efficiently from an imaging element with just a heat dissipating plate attached to the rear face of the imaging element.

SUMMARY

One object of the technology disclosed herein is to provide a heat dissipating structure for an imaging unit in which heat dispersal efficiency is improved.

In accordance with one aspect of the invention, a heat dissipating structure for an imaging unit is provided that comprises an imaging element configured to convert light into an electrical signal, a first heat dissipating plate, a second heat dissipating plate, and a heat dissipating portion. The first heat dissipating plate has a first end and a second end disposed opposite to the first end, and is positioned on the rear face side of the imaging element. The second heat dissipating plate is positioned on the rear face side of the first heat dissipating plate. The heat dissipating portion is fixedly coupled to the first end of the second heat dissipating plate.

These and other objects, features, aspects and advantages of the present invention will become apparent to those skilled in the art from the following detailed description, which, taken in conjunction with the annexed drawings, discloses embodiments of the present invention.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

1: Overall Configuration

Figures 1A, 1B:
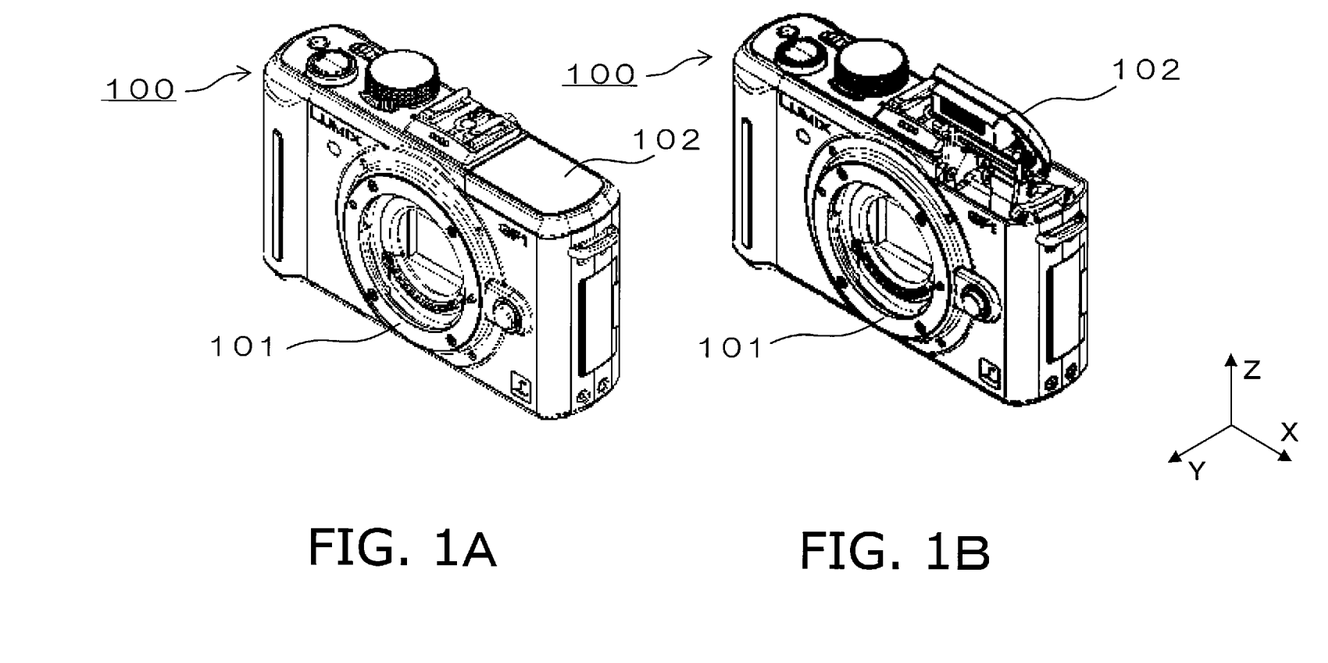
FIG. 1A is an oblique view of a digital camera body.
FIG. 1B is an oblique view of a digital camera body (popped up state)

FIG. 1A shows a flash 102 in its closed state, and FIG. 1B shows the flash 102 in its popped-up state.

In the following description, for the sake of clarity, the face on the subject side will be called the front face, the face on the opposite side from the subject will be called the rear face, the subject side will be called the front face side, and the opposite side from the subject will be called the rear face side or the back. The upper side in the vertical direction in the ordinary landscape orientation will simply be called the "upper side," and similarly the lower side in the vertical direction will simply be called the "lower side." Further, the right side when a digital camera 100 is viewed from the front will simply be called the "right side," and the left side when the digital camera body 100 is viewed from the front will simply be called the "left side." These expressions do not limit the usage state of the digital camera body 100.

A three-dimensionally perpendicular coordinate system is set up for the digital camera 100. The X axis is set parallel to the left and right direction when the digital camera body 100 is used. The Y axis is set parallel to the optical axis X of an interchangeable lens. The Z axis is set parallel to the up and down direction (vertical direction) when the digital camera body 100 is used. In the following description, the X axis direction shall be a direction parallel to the X axis. The Y axis direction shall be a direction parallel to the Y axis. The Z axis direction (an example of a first direction) shall be a direction parallel to the Z axis. The left side facing the subject shall be termed the X axis direction positive side. The subject side in the Y axis direction shall be termed the Y axis direction positive side. The upper side along the Z axis direction shall be termed the Z axis direction positive side.

The digital camera body 100 comprises a mount 101 (an example of a mounting portion) for mounting an interchangeable lens (not shown). When the flash 102 is not being used, the flash 102 is stowed in the digital camera body 100 as in FIG. 1A. When the flash 102 is to be used, the flash 102 is popped up as in FIG. 1B by pressing a pop-up button (not shown) provided to the rear face of the digital camera body 100.

A flash unit 200 is popped up to an angle of approximately 45 degrees with respect to the digital camera body 100 by link mechanisms 201, 202, and 203 located in three places. When the pop-up button is pressed, this releases a prong (not shown) that latches a flash cover 207 to the digital camera body 100. The flash cover 207, which comprises a light emitter 206, is pushed out to the pop-up position by the elastic force of a spring (not shown) supported by spring support components 204 and 205. The charge needed for the light emitter 206 to emit light is supplied through a cable 208 and from a capacitor 109 (discussed below) installed at the lower part of the digital camera body 100.

Figures 2A, 2B, 2C, 2D, 2E:
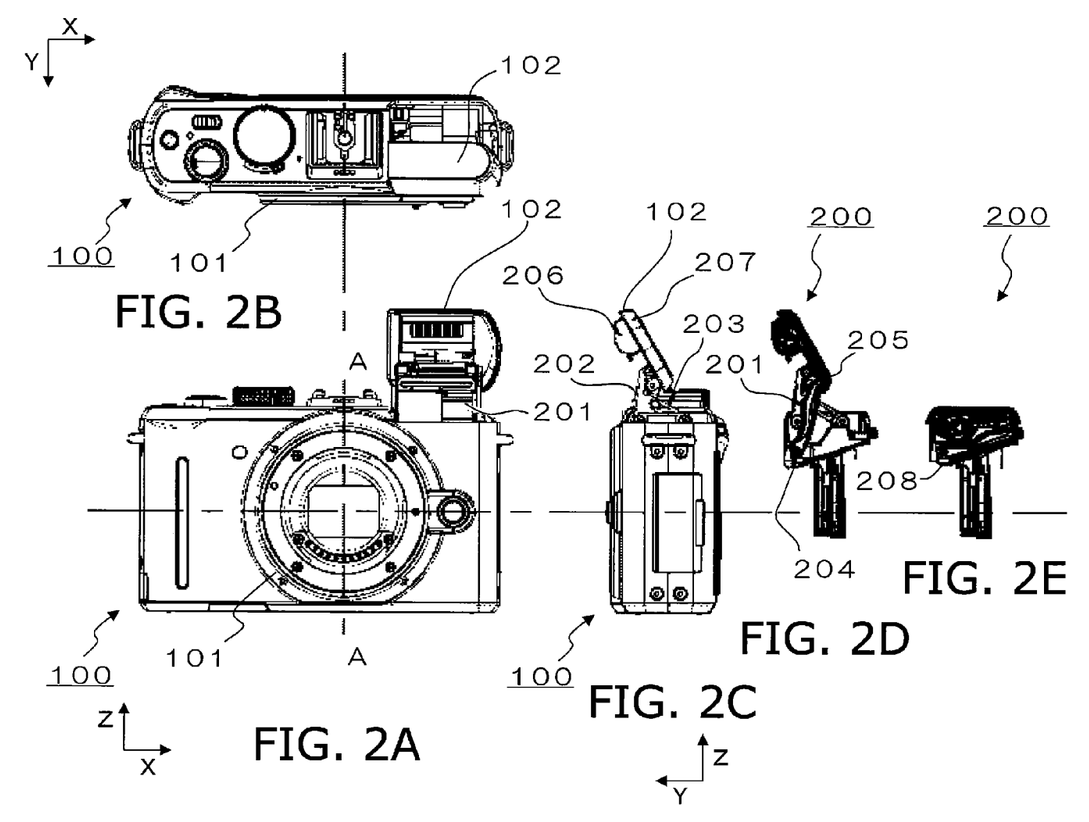
FIG. 2A is a front view of a digital camera body.
FIG. 2B is a top view of a digital camera.
FIG. 2C is a side view of a digital camera body on the right side as seen from the front.
FIG. 2D is a side view of a flash unit in a popped-up state.
FIG. 2E is a side view of a flash unit in a state of being held in a digital camera body.
Figure 3:
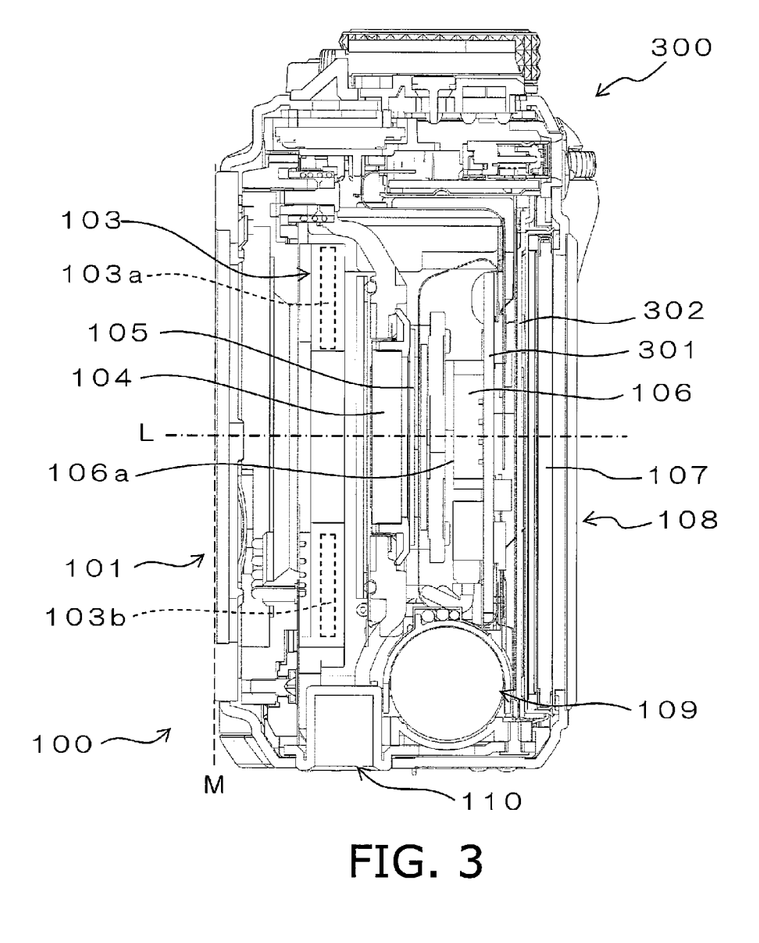
FIG. 3 is a cross section along the III-III line in FIG. 2A.

FIG. 3 is a cross section of a digital camera body. This drawing shows a cross section along the A-A line shown in FIG. 2A. The line L indicates the optical axis, while the line M indicates the mounting face.

The digital camera body 100 is not equipped with an optical viewfinder because it is not a so-called single lens reflex type. Accordingly, the digital camera body 100 is not equipped with a mirror box, either. Nor is there a penta-mirror or pentaprism for guiding incident light reflected by a mirror to the eyepiece lens of the optical viewfinder. With the digital camera body 100, an image produced by an imaging element 106 is displayed on a liquid crystal monitor 108 provided to the rear face. Consequently, the user can decide on the composition while looking at the subject image on the liquid crystal monitor 108.

The digital camera body 100 may be equipped with an electronic viewfinder that displays images produced by the imaging element 106. In this case, the electronic viewfinder is disposed at the position where the optical viewfinder would be disposed with a single lens reflex type of digital camera body, for example.

Since the digital camera body 100 thus has no mirror box, it can be made thinner, particularly in the direction parallel to the optical axis L.

Meanwhile, many parts are disposed very close together inside the digital camera body 100. More specifically, as shown in FIG. 3, a shutter unit 103, an ultrasonic filter 104, an optical low-pass filter 105, the imaging element 106, and a main board 107 are disposed starting from the mount 101 side along the optical axis L. Also, the liquid crystal monitor 108 is on the rear face of the digital camera body 100. Further, a tripod attachment component 110 that receives a screw provided to a tripod is provided to the lower part of the digital camera body 100 for fixing the digital camera body 100 to a tripod. A first heat dissipating plate 301 and a second heat dissipating plate 302 are provided on the rear face side of the imaging element 106. The first heat dissipating plate 301 and second heat dissipating plate 302 will be discussed below.

The mount 101 is mechanically and electrically linked to a mount provided to an interchangeable lens. This allows the interchangeable lens to be fixed to the digital camera body 100, and allows power to be supplied from the digital camera body 100 to the interchangeable lens, and allows communication between the interchangeable lens and the digital camera body 100.

The ultrasonic filter 104 has a diaphragm (not shown), and a piezoelectric element (not shown) that drives the diaphragm. When voltage of a specific frequency is applied to the piezoelectric element, the diaphragm vibrates, allowing any dust that is clinging to the diaphragm to be removed.

The optical low-pass filter 105 is an optical filter used to cut out incident light of a spatial frequency that exceeds the resolution of the imaging element 106. Examples of the imaging element 106 include a CCD image sensor, a CMOS image sensor, or another such imaging element. The imaging element 106 is not limited to being a CCD image sensor or a CMOS image sensor, however.

An infrared cut filter (not shown) is disposed on the front face of the imaging element 106. The ultrasonic filter 104, the optical low-pass filter 105, and the imaging element 106 constitute an imaging element unit 500. The ultrasonic filter 104, the optical low-pass filter 105, and the imaging element 106 may be integrally constituted as the imaging element unit 500.

The capacitor 109 supplies a charge through a cable 208 to the light emitter 206 of the flash unit 200. The capacitor 109 is cylindrical in shape, and is disposed at the lower part of the digital camera body 100. More specifically, the capacitor 109 is disposed on the rear face side of the mount 101, and is disposed at the lower part of the imaging element unit 500. The center axis C of the capacitor 109 is substantially parallel to the lateral direction of the digital camera body 100. The capacitor 109 may be an electrostatic capacitor, or may be another type of capacitor (such as an electric double layer capacitor). Furthermore, the capacitor 109 may be an electrical storage device other than a capacitor.

The mount 101 needs to have a specific diameter for attaching an interchangeable lens. On the other hand, the size of the imaging element 106 is standardized as 35 mm full size, APS-C size, 4/3 size, or the like, while the height of an imaging element 160 (the dimension in the up and down direction in FIG. 3) shall not exceed the diameter of the mount 101. Therefore, a space is created on the rear face side of the mount 101 and the lower side of the imaging element unit 500. The digital camera body 100 can be made more compact by disposing the cylindrical capacitor 109 in this space.

Since the imaging element 106 is wider than it is long (the width is the dimension in the direction perpendicular to the paper plane in FIG. 3), a space formed on the rear face side of the mount 101 and on the lower side of the imaging element 106 is larger than the left and right spaces of the imaging element 106 on the rear face side of the mount 101. Furthermore, as will be discussed below, many parts are disposed to the left and right of the imaging element unit 500. Therefore, disposing the capacitor 109 on the rear face side of the mount 101 and on the lower side of the imaging element 106 contributes greatly to making the digital camera body 100 smaller.

A space is also formed for the same reason on the rear face side of the mount 101 and on the upper side of the imaging element unit 500. As shown in FIG. 2A, numerous manipulation members, the flash 102, and so forth are disposed on the upper face of the digital camera body 100, but as long as a space is left, the capacitor 109 can be disposed in that space.

Figure 4:
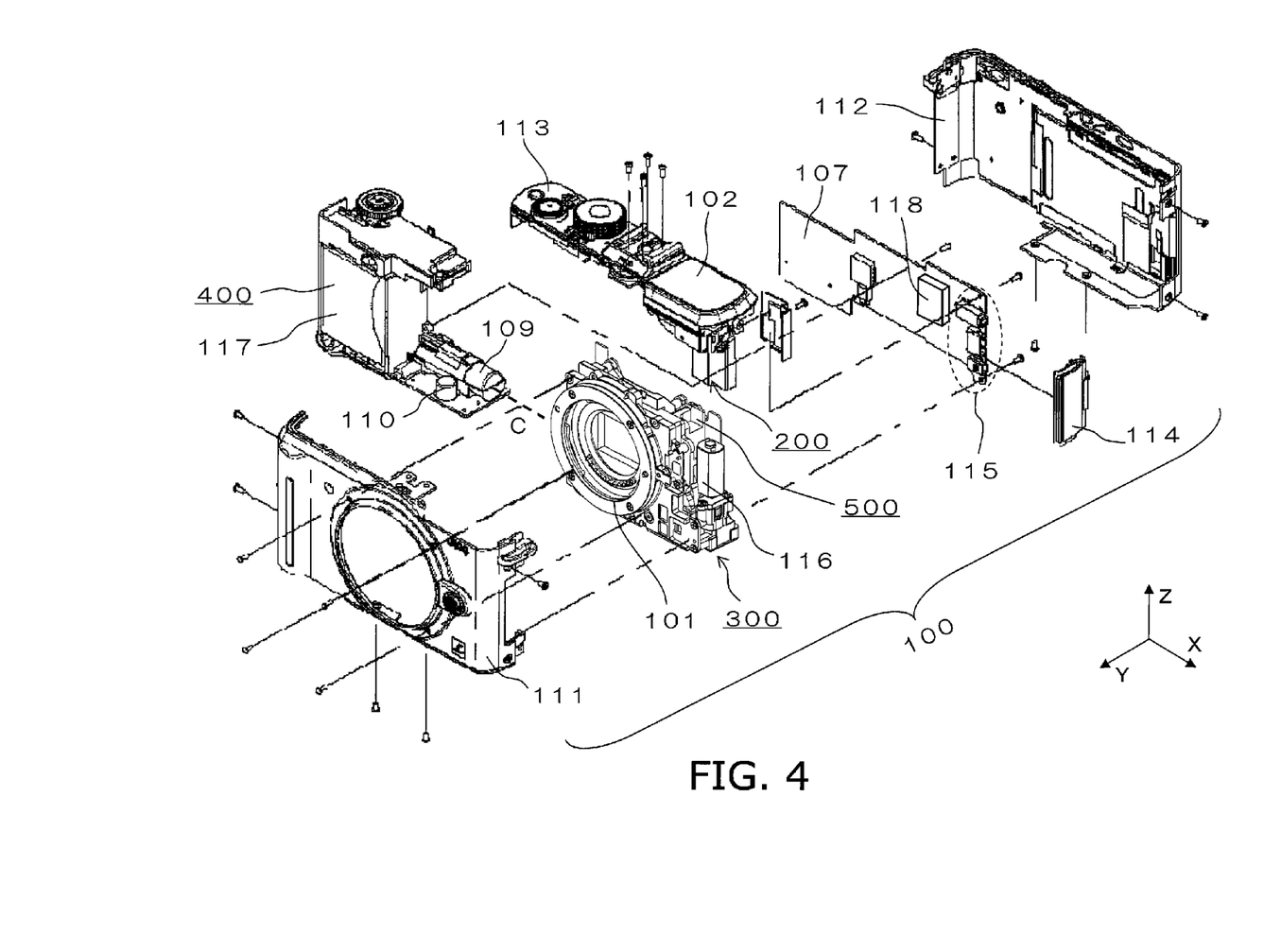
FIG. 4 is an exploded oblique view of a digital camera body.

As shown in FIG. 4, the digital camera body 100 is such that an imaging unit 300, a battery unit 400, and the main board 107 are enclosed in a front case 111 and a rear case 112. The upper part of the digital camera body 100 is covered by a top case 113.

The imaging unit 300 has the mount 101, a shutter, and the imaging element unit 500. As discussed above, the imaging element unit 500 has the ultrasonic filter 104, the optical low-pass filter 105, and the imaging element 106. A shutter driver 116 that drives the shutter is disposed on the right side of the imaging element unit 500. The shutter driver 116 has a stepping motor or other such actuator.

Figure 7:
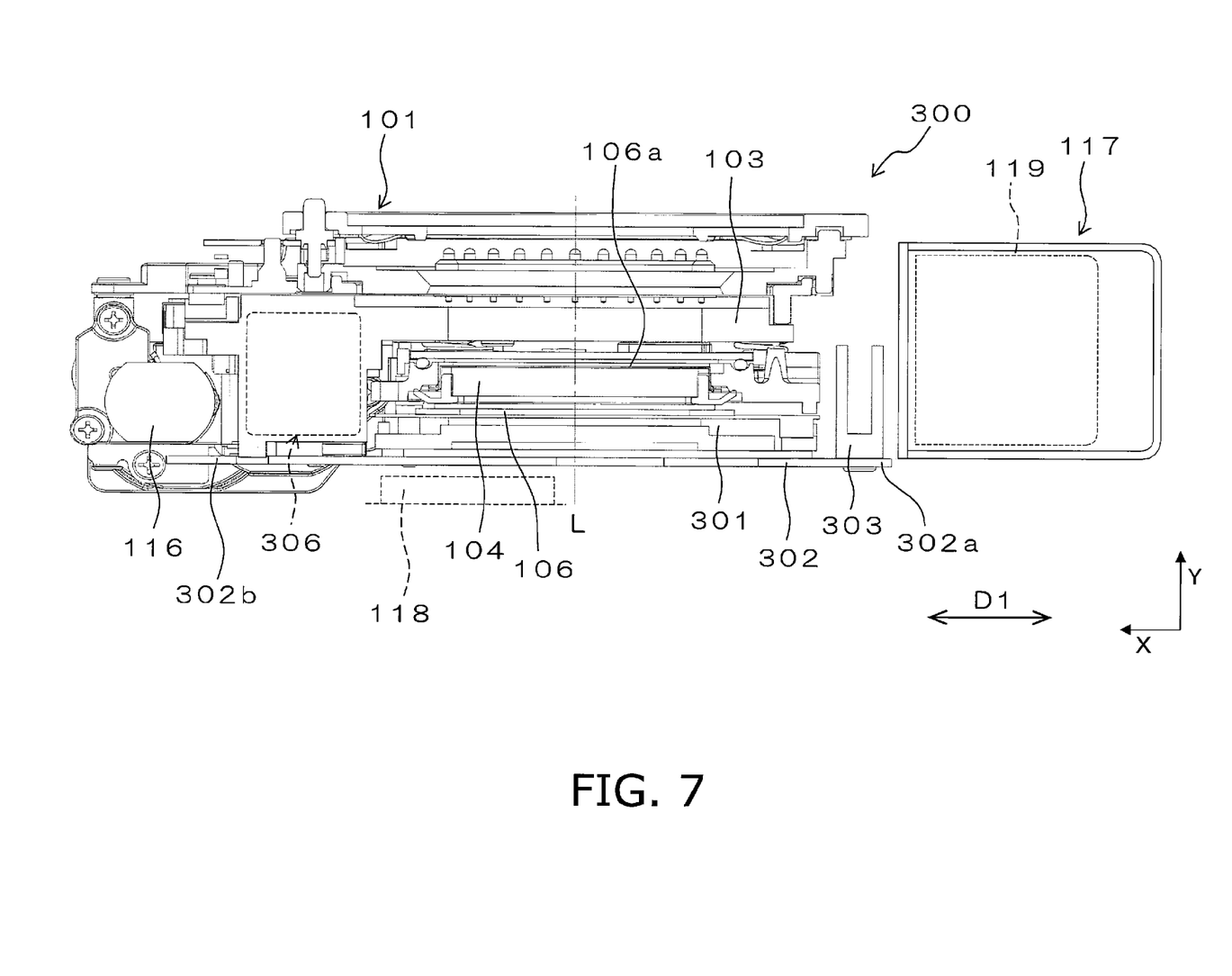
FIG. 7 is a cross section of an imaging unit.

The battery unit 400 has a battery case 117, the capacitor 109, and the tripod attachment component 110. The battery case 117 can also hold a memory card or other such storage medium in addition to a battery 119 (FIG. 7). The battery case 117 takes up most of the space on the left side of the imaging element unit 500.

An IC chip for controlling the various components of the digital camera body 100, an IC chip for performing various kinds of image processing, an IC for controlling the power supply from the battery 119, and so forth are mounted on the main board 107. In this embodiment, an unified IC chip 118 that integrates an IC chip for controlling the various components of the digital camera body 100 with an IC chip for performing various kinds of image processing is mounted on the main board 107.

The unified IC chip 118 (an example of a signal processor) subjects the electrical signals outputted by the imaging element 106 to specific image processing, so a large amount of heat is generated when a high-load state is continued for an extended period, such as in the capture of a moving picture. The unified IC chip 118 is disposed in the vicinity of the shutter driver 116 when the digital camera body 100 is assembled. A terminal group 115 for connecting the digital camera body 100 with various kinds of external device is mounted on the right side of the main board 107. The terminal group 115 includes, for example, an AV-out terminal, an HDMI (high-definition multimedia interface) terminal for displaying images on a high-definition television set, and a USB terminal for transferring image data to a computer. The terminal group 115 is covered by a terminal cover 114.

The flash unit 200 is attached on the right side of the top case 113. The flash unit 200 also includes its drive mechanism, and has a shape that extends toward the lower part of the digital camera body 100.

As mentioned above, the right side of the digital camera body 100 is taken up by part of the flash unit 200, the shutter driver 116, and the terminal group 115. Meanwhile, the left side of the digital camera body 100 is taken up by the battery case 117. Therefore, disposing the capacitor 109 on the lower side of the imaging element 106 and on the rear face side of the mount 101 contributes greatly to making the digital camera body 100 smaller.

2: Configuration of Imaging Unit

Figure 5A:
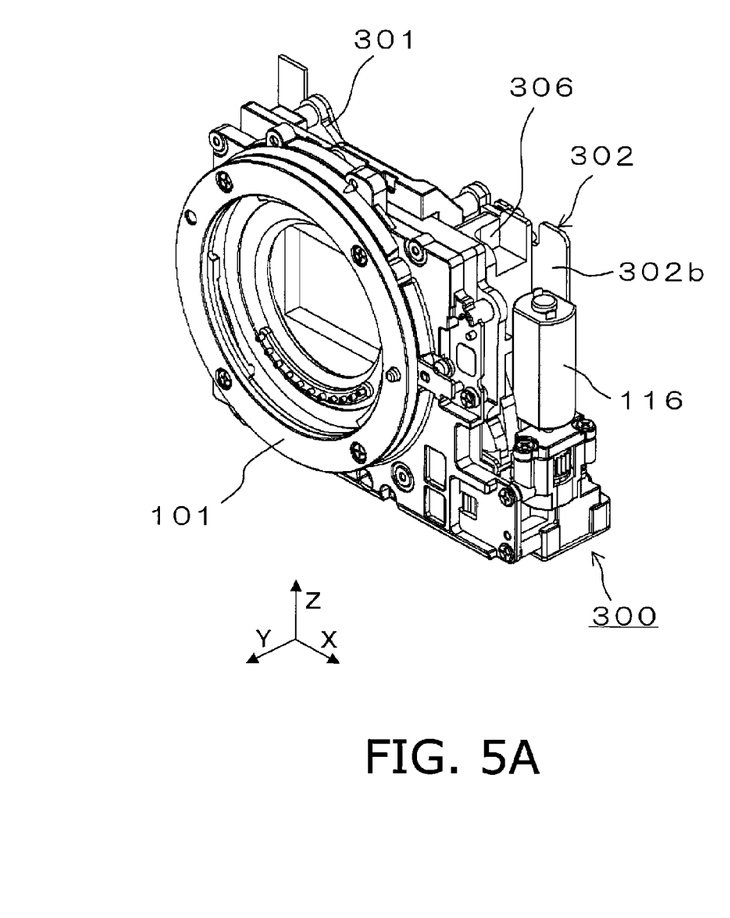
FIG. 5A is an oblique view of an imaging unit as seen from the front face side.
Figure 5B:
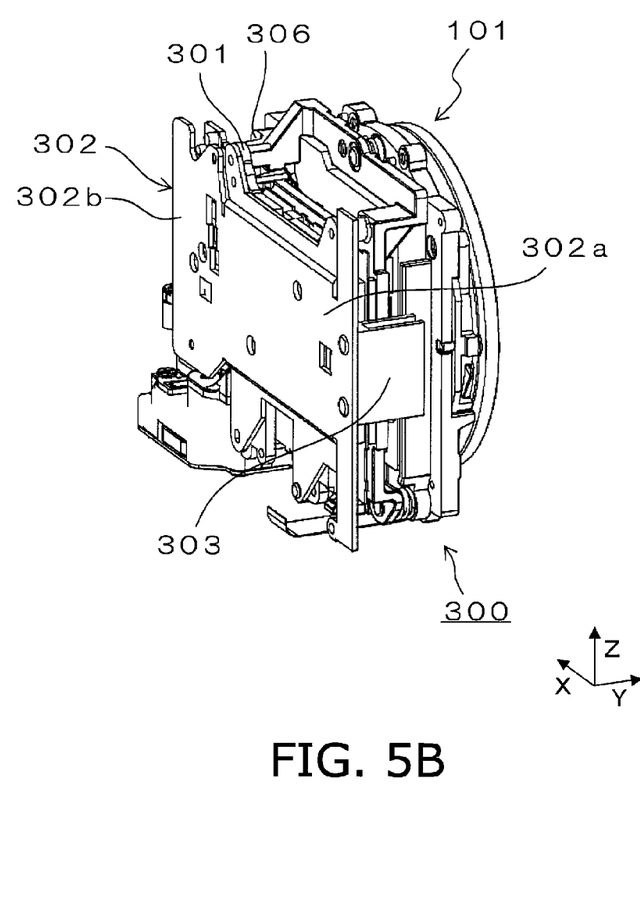
FIG. 5B is an oblique view of an imaging unit as seen from the rear face side.

As shown in FIG. 5, the first heat dissipating plate 301 (an example of a first heat dissipating plate) and the second heat dissipating plate 302 (an example of a second heat dissipating plate) are disposed on the rear face side of the imaging element 106. More precisely, the first heat dissipating plate 301 is disposed on the rear face side of the imaging element 106, and the second heat dissipating plate 302 is disposed on the rear face side of the first heat dissipating plate 301. The first heat dissipating plate 301 is attached to the imaging element 106.

The second heat dissipating plate 302 is a plate-like member with a substantially rectangular shape, and has a first end 302a and a second end 302b disposed on the opposite side from the first end 302a. The first end 302a is the end on the left side of the second heat dissipating plate 302. The second end 302b is the end on the right side of the second heat dissipating plate 302. A heat dissipating member 303 is attached to the first end 302a.

The heat dissipating member 303 (an example of a heat dissipating portion and an example of a heat dissipating member) is provided to disperse the heat transmitted to the second heat dissipating plate 302, and is fixed to the first end 302a of the second heat dissipating plate 302.

The first heat dissipating plate 301, the second heat dissipating plate 302, and the heat dissipating member 303 are all formed from aluminum. However, the first heat dissipating plate 301, the second heat dissipating plate 302, and the heat dissipating member 303 may instead be formed from some other material with relatively high thermal conductivity. For instance, the first heat dissipating plate 301, the second heat dissipating plate 302, and the heat dissipating member 303 may be formed from copper.

The first heat dissipating plate 301 and the second heat dissipating plate 302 transmit heat generated by the imaging element 106 to the heat dissipating member 303. Also, the second heat dissipating plate 302 has a heat dissipating function for itself. The heat dissipating member 303 preferably has as large a surface area as possible in order to improve heat dissipation efficiency. In this embodiment, the heat dissipating member 303 of the imaging unit 300 is substantially U-shaped, connecting two heat dissipating fins. However, the heat dissipating member 303 may have more heat dissipating fins, and a plurality of heat dissipating blocks may be formed on the surface thereof.

Figure 6:
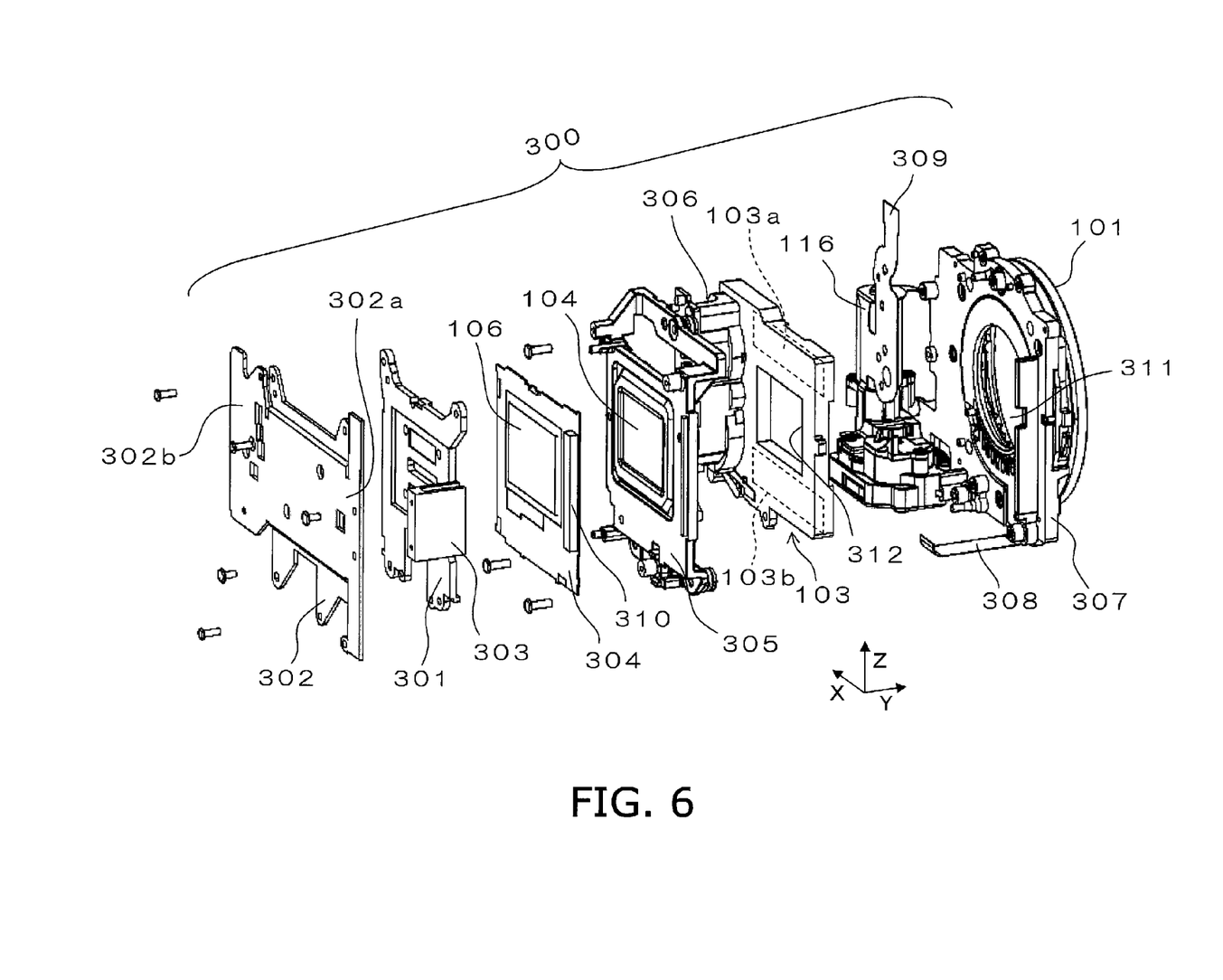
FIG. 6 is an exploded oblique view of an imaging unit.

As shown in FIG. 6, the imaging unit 300 has a frame 307, the shutter unit 103, an ultrasonic filter unit 305, an imaging element board 304, the first heat dissipating plate 301, the second heat dissipating plate 302, and the heat dissipating member 303, starting from the mount 101 side.

The frame 307 and the mount 101 are formed integrally. However, frame 307 and the mount 101 need not be formed integrally, and the mount 101 may be attached to the frame 307. The frame 307 is formed from aluminum. Because aluminum has good rigidity and also has excellent heat dissipating properties, the interchangeable lens mounted to the mount 101 can be securely supported by the mount 101. Also, the frame 307 serves as a base for attaching the shutter unit 103, the ultrasonic filter unit 305, the imaging element board 304, the first heat dissipating plate 301, and the second heat dissipating plate 302. The shutter driver 116 is attached to the frame 307. A flexible cable 309 is connected to the shutter driver 116 in order to operate a stepping motor or other such actuator built into the shutter driver 116. The mount 101 is equipped with a plurality of contact pins 311. Consequently, when the interchangeable lens is mounted to the mount 101, the digital camera body 100 and the interchangeable lens can communicate with each other. The signals exchanged via the contact pins 311 are transmitted through a flexible cable 308 to the unified IC chip 118 on the main board 107.

The shutter unit 103 is provided to block subject light from reaching the imaging element 106, and has a front curtain 103a (an example of a shutter curtain), a rear curtain 103b (an example of a shutter curtain), and a shutter support portion 306 (an example of a shutter support portion). The front curtain 103a and the rear curtain 103b are provided to block off an opening 312. The shutter support portion 306 is able to hold the front curtain 103a and rear curtain 103b electromagnetically in the open position, and is disposed on the right side of the imaging element 106. FIG. 6 shows a state in which the front curtain (an example of a shutter curtain) is held on the lower side of the opening 312, and the rear curtain (an example of a shutter curtain) is held on the upper side of the opening 312. Therefore, with the shutter unit 103 shown in FIG. 6, the opening 312 is in its open state.

When a still picture is captured with a typical, normally-closed shutter, exposure is performed by moving the rear curtain 103b a specific amount of time after the front curtain 103a has moved. Accordingly, first the opening 312 is blocked off by the front curtain 103a, and the rear curtain 103b is held on the upper side of the opening 312. This operation is called charging the shutter unit 103. The charging of the shutter unit 103 is carried out by transmitting the rotational force of a stepping motor or other such actuator enclosed in the shutter driver 116 through a gear and cam (not shown) and to a lever (not shown) provided to the shutter support portion 306. In a state in which the shutter unit 103 has been charged, spring force acts on the front curtain 103a and the rear curtain 103b and tries to move them from the upper part to the lower part of the opening 312, but the front curtain 103a and rear curtain 103b are mechanically supported against the spring force by the shutter support portion 306.

Next, power is sent to solenoids corresponding to the front curtain 103a and the rear curtain 103b enclosed in the shutter support portion 306, which electromagnetically fixes the front curtain 103a and the rear curtain 103b. After this, the mechanical locking of the front curtain 103a and the rear curtain 103b is released. When a still picture is to be captured, the front curtain 103a moves when power to the solenoid corresponding to the front curtain 103a is halted, and the rear curtain 103b moves when power to the solenoid corresponding to the rear curtain 103b is halted a specific amount of time later.

On the other hand, when a moving picture is to be captured, a state has to be maintained in which the opening 312 is open as shown in FIG. 6, so the power to the solenoid corresponding to the front curtain 103a is halted to move the front curtain 103a, but power to the solenoid corresponding to the rear curtain 103b must be continued. Therefore, when a moving picture is to be captured, heat is generated from the solenoid corresponding to the rear curtain 103b enclosed in the shutter support portion 306.

In view of this, the shutter support portion 306 is disposed near the second heat dissipating plate 302. More specifically, as shown in FIG. 7, the shutter support portion 306 is disposed so as to be opposite the second heat dissipating plate 302. Consequently, heat generated by the shutter support portion 306 is readily transmitted to the second heat dissipating plate 302, and heat dissipation around the shutter support portion 306 tends to be promoted.

The ultrasonic filter unit 305 has the ultrasonic filter 104 and a frame to which the ultrasonic filter 104 is fixed. The ultrasonic filter 104 has a diaphragm and a piezoelectric element that drives the diaphragm.

The imaging element 106 is mounted on the imaging element board 304. Signals for driving the imaging element 106 and image signals outputted by the imaging element 106 are sent through a cable (not shown) connected to a connector 310, and to the unified IC chip 118 on the main board 107.

The first heat dissipating plate 301 is disposed on the rear face side of the imaging element board 304 (the rear face side of the imaging element 106), and dissipates heat generated by the imaging element 106. Since the first heat dissipating plate 301 also serves as a reference for attaching the imaging element board 304, it preferably will provide a certain amount of stiffness. Therefore, the first heat dissipating plate 301 preferably has a certain amount of thickness. In this embodiment, the thickness of the first heat dissipating plate 301 is greater than the thickness of the second heat dissipating plate 302.

The second heat dissipating plate 302 is disposed on the rear face side of the first heat dissipating plate 301, transmits the heat of the first heat dissipating plate 301 to the heat dissipating member 303, and also has a function of dissipating its own heat. As shown in FIG. 6, the heat dissipating member 303 is fixed on the left side of the second heat dissipating plate 302. The first heat dissipating plate 301 and the second heat dissipating plate 302 are fixed with screws. The second heat dissipating 302 and the heat dissipating member 303 are fixed with screws. However, these members can be fixed with a heat-conducting tape or a heat-conducting adhesive. When the fixing is done with screws, the contact parts may be coated with a heat-conducting grease. The right side of the second heat dissipating plate 302 is on the rear face side of the shutter support portion 306, so the heat generated by the shutter support portion 306 (more precisely, the heat generated by the solenoid for the rear curtain enclosed in the shutter support portion 306) can be efficiently dissipated. Also, since the unified IC chip 118 is disposed at the back on the right side of the second heat dissipating plate 302, the second heat dissipating plate 302 can efficiently dissipate the heat generated by the unified IC chip 118.

As shown in FIG. 7, the heat dissipating member 303 is fixed on the second heat dissipating plate 302, and is fixed to the first end 302a on the left side, which is the opposite side from the right side where the shutter support portion 306 and the unified IC chip 118, which are heat sources, are located, so heat dissipation efficiency can be improved. The first end 302a is disposed on substantially the opposite side from the shutter support portion 306 with respect to the imaging element 106. With the digital camera body 100 pertaining to this embodiment, the gap ensured on the left side is larger than that on the right side, so the heat dissipating member 303 is disposed at the end on the left side of the second heat dissipating plate 302 (that is, the first end 302a). However, depending on the configuration of the digital camera body 100, the heat dissipating member 303 can also be disposed at the end on the upper or lower side of the second heat dissipating plate 302. Also, it can be disposed at the end more to the right side than the shutter support portion 306 and the unified IC chip 118. In any case, it is preferable in terms of heat dissipation efficiency if the heat dissipating member 303 is disposed at the first end 302a, away from the unified IC chip 118 and the shutter support portion 306, which are heat sources.

Thus disposing the second heat dissipating plate 302 on the rear face side of the first heat dissipating plate 301 allows heat generated by the imaging element 106 to be efficiently dissipated. Furthermore, heat generated by the shutter support portion 306 (more precisely, heat generated by the solenoid used for the rear curtain enclosed in the shutter support portion 306) can be dissipated efficiently at the right front face of the second heat dissipating plate 302, and heat generated by the unified IC chip 118 can be effective dissipated at the right front face of the second heat dissipating plate 302. Heat collected in the second heat dissipating plate 302 is efficiently diffused by the heat dissipating member 303 within the housing of the digital camera body 100. Specifically, heat generated by the various heat sources in the digital camera body 100 can be dissipated in a concentrated fashion.

Also, the imaging element 106, the shutter support portion 306, and the heat dissipating member 303 lie within substantially the same plane. More precisely, the imaging element 106, the shutter support portion 306, and the heat dissipating member 303 are disposed aligned in a lengthwise direction D1 (X axis direction) parallel to the light receiving face 106a of the imaging element 106. Accordingly, this combines with the substantially flat main board disposed on the rear face side of the imaging unit 300 so that there is no wasted space created in the housing of the digital camera body 100, and the digital camera body 100 can be made smaller and thinner.

The lengthwise direction D1 here substantially coincides with the lengthwise direction of the digital camera body 100, and also substantially coincides with the lengthwise direction of the light receiving face 106a. The lengthwise direction D1 in landscape orientation substantially coincides with the left and right direction.

Also, since the first heat dissipating plate 301 and the second heat dissipating plate 302 are fixed to the frame 307 along with the shutter unit 103, the ultrasonic filter unit 305, and the imaging element board 304, the imaging unit 300 can be securely put together, and heat can be dissipated through the frame 307.

Furthermore, since the interchangeable lens is mounted to the mount 101 formed on the frame 307, heat generated by the digital camera body 100 can be dispersed into the interchangeable lens.

Features

Features of the imaging unit 300 described above will be compiled below.

(1) With this imaging unit 300, the second heat dissipating plate 302 is disposed on the rear face side of the first heat dissipating plate 301, and the heat dissipating member 303 is provided to the first end 302a of the second heat dissipating plate 302. Accordingly, heat generated by the imaging element 106 can be efficiently dissipated not only from the first heat dissipating plate 301, but also from the heat dissipating member 303 and the second heat dissipating plate 302. Therefore, heat dissipation efficiency can be improved with this imaging unit 300.

(2) As shown in FIG. 7, since the thickness of the first heat dissipating plate 301 is greater than the thickness of the second heat dissipating plate 302, the strength of the imaging element unit 500 can be increased by the first heat dissipating plate 301.

(3) As shown in FIG. 7, since the shutter support portion 306 is disposed so as to be opposite the second heat dissipating plate 302, heat generated by the shutter support portion 306 is readily transmitted to the second heat dissipating plate 302, and the transmitted heat is dissipated from the second heat dissipating plate 302, or through the second heat dissipating plate 302 and from the heat dissipating member 303. Therefore, heat generated by the shutter support portion 306 can be efficiently dissipated.

Also, the shutter support portion 306 is disposed at a position that is closer to the second end 302b of the second heat dissipating plate 302 than the first end 302a. Therefore, the heat dissipating member 303 can be disposed at a position that is relatively remote from the shutter support portion 306, and this makes it less likely that heat will collect around the shutter support portion 306.

Furthermore, when viewed in the Z axis direction, the imaging element 106 is disposed between the heat dissipating member 303 and the shutter support portion 306, so heat dissipation efficiency can be improved while allowing the constituent parts to be disposed more efficiently, and this should lead to a smaller imaging unit 300.

(4) As shown in FIG. 7, since the unified IC chip 118 is disposed so as to be opposite the second heat dissipating plate 302, heat generated by the unified IC chip 118 is readily transmitted to the second heat dissipating plate 302, and the transmitted heat is dissipated from the second heat dissipating plate 302, or through the second heat dissipating plate 302 and from the heat dissipating member 303. Therefore, heat generated by the unified IC chip 118 can be efficiently dissipated.

Also, since the unified IC chip 118 is disposed at a position that is closer to the second end 302b and the first end 302a, the heat dissipating member 303 is disposed at a position that is relatively remote from the shutter support portion 306. Therefore, it is it less likely that heat will collect around the unified IC chip 118.

(5) As shown in FIG. 7, since the heat dissipating member 303 is disposed between the battery case 117 and the imaging element 106, the heat dissipating member 303 is disposed at a position that is relatively close to the battery case. Therefore, heat generated from the heat dissipating member 303 is readily transmitted to the battery case 117, and heat dissipation efficiency can be further enhanced.

Also, by disposing the heat dissipating member 303 between the battery case 117 and the imaging element 106, the space formed between the imaging element 106 and the battery case 117 can be effectively utilized, which should allow the imaging unit 300 to be smaller.

Second Embodiment

In the first embodiment above, the heat dissipating portion was described using the heat dissipating member 303 as an example, but the heat dissipating portion is not limited to that in the above embodiment. For example, the heat dissipating portion may be the battery case 117.

In the following description, those components having substantially the same function as in the first embodiment above will be numbered the same, and will not be described again in detail.

Figure 8:
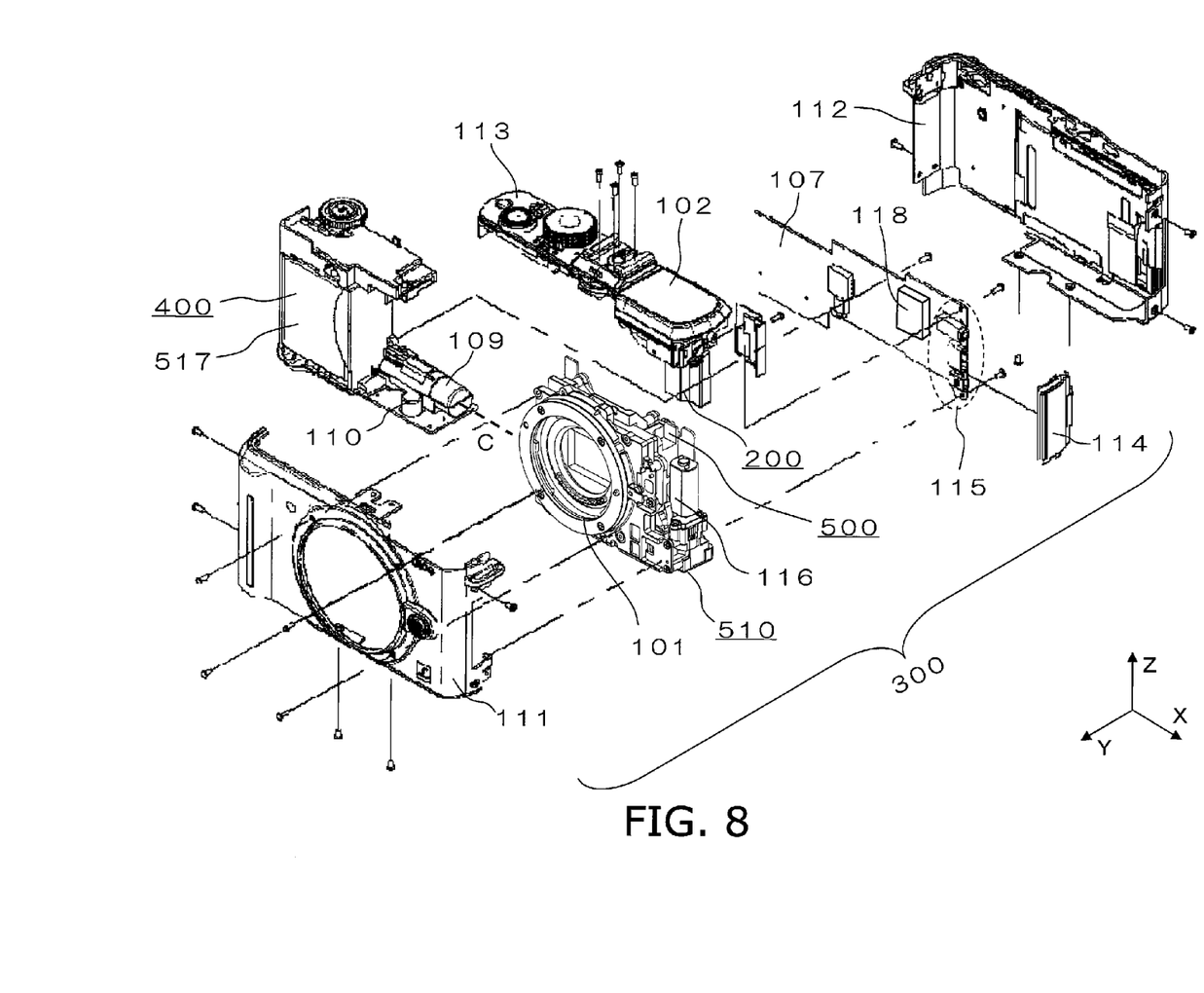
FIG. 8 is an exploded oblique view of a digital camera body (second embodiment)
Figure 9:
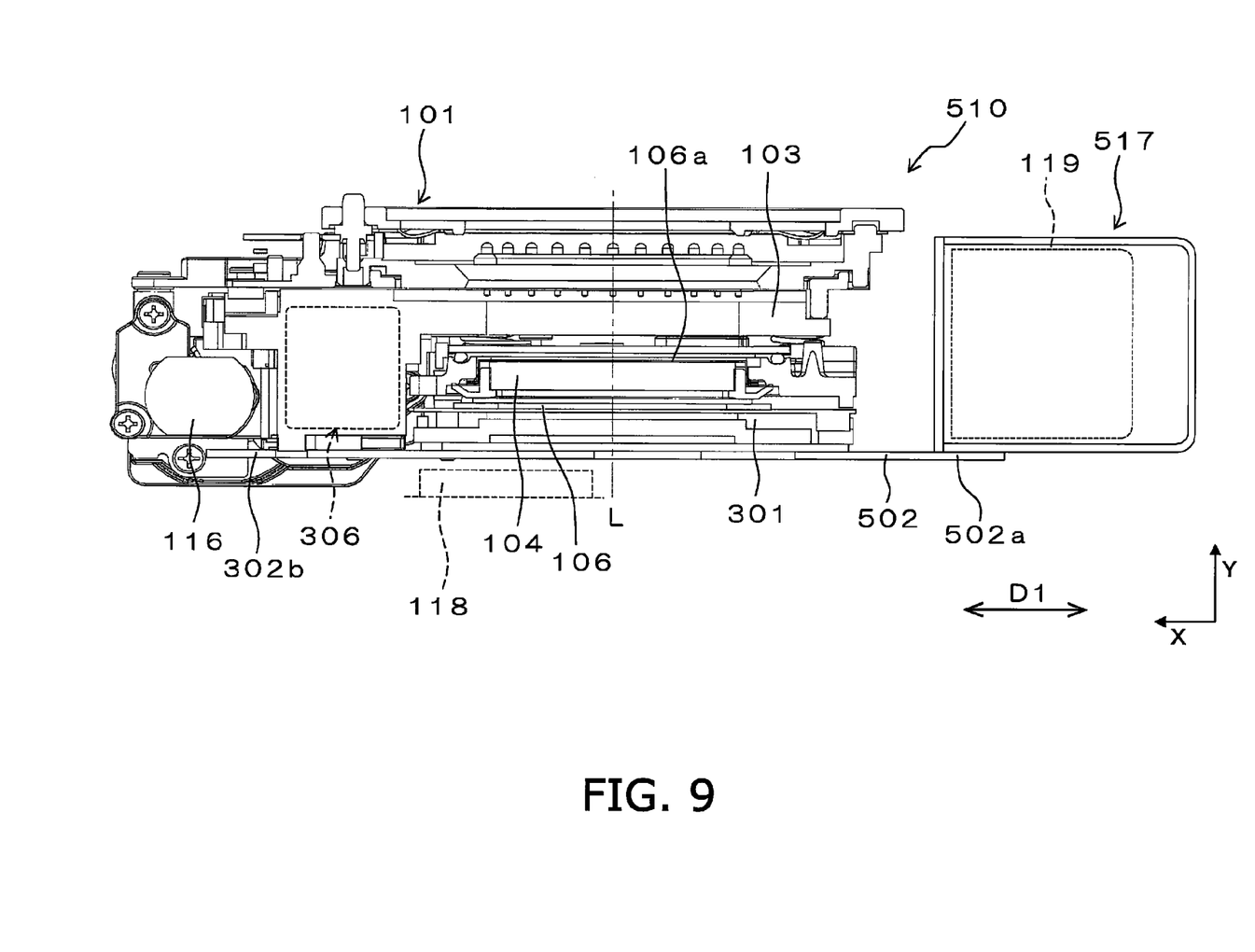
FIG. 9 is a cross section of an imaging unit (second embodiment)

The imaging unit 510 shown in FIGS. 8 and 9 has the first heat dissipating plate 301, a second heat dissipating plate 502, and a battery case 517 (an example of a heat dissipating portion, and an example of a battery case). The second heat dissipating plate 502 has substantially the same shape as the second heat dissipating plate 302, but differs from the shape of the second heat dissipating plate 302 in being connected to the battery case 517. The second heat dissipating plate 502 is disposed on the rear face side of the first heat dissipating plate 301, and is connected to the first heat dissipating plate 301. Also, a first end 502a of the second heat dissipating plate 502 is fixed to the battery case 517. More precisely, the end of the second heat dissipating plate 502 on the opposite side from the shutter support portion 306 is fixed to the battery case 517. The second heat dissipating plate 502 is formed from aluminum, copper, or another such material that has relatively high thermal conductivity, just as with the second heat dissipating plate 302. The battery case 517 houses the battery 119, and is formed from aluminum, copper, or another such material that has relatively high thermal conductivity, for example.

Part of the heat transmitted to the second heat dissipating plate 502 is transmitted to the battery case 517, and is dissipated from the battery case 517 to the surroundings or to the interior of the battery case 517. Because the battery case 517 has a relatively large surface area, heat dissipation can be promoted as well as, or better than, with the heat dissipating member 303. Thus, with this imaging unit 300, the battery case 517 also functions as a heat dissipating portion, and heat dissipation efficiency can be improved.

Also, the imaging element 106 is disposed between the shutter support portion 306 and the battery case 517 when viewed in the Z axis direction. Therefore, heat dissipation efficiency can be improved while allowing the constituent parts to be disposed more efficiently, and this should lead to a smaller imaging unit 300.

Third Embodiment

An embodiment that combines the first and second embodiments is also possible. More specifically, the imaging unit 520 shown in FIG. 10 has the first heat dissipating plate 301, the second heat dissipating plate 502, the heat dissipating member 303 (an example of a heat dissipating portion, and an example of a heat dissipating member), and the battery case 517 (an example of a heat dissipating portion, and an example of a battery case). The heat dissipating member 303 is connected to the second heat dissipating plate 502, and is disposed between the imaging element 106 and the battery case 517. The second heat dissipating plate 502 is disposed on the rear face side of the first heat dissipating plate 301, and is connected to the first heat dissipating plate 301. Also, the first end 502*a* of the second heat dissipating plate 502 is fixed to the battery case 517. More precisely, the end of the second heat dissipating plate 502 on the opposite side from the shutter support portion 306 is fixed to the battery case 517. The second heat dissipating plate 502 is formed from aluminum, copper, or another such material with relatively high thermal conductivity, just as with the second heat dissipating plate 302. The battery case 517 houses the battery 119, and is formed from aluminum, copper, or another such material that has relatively high thermal conductivity, for example.

Figure 10:
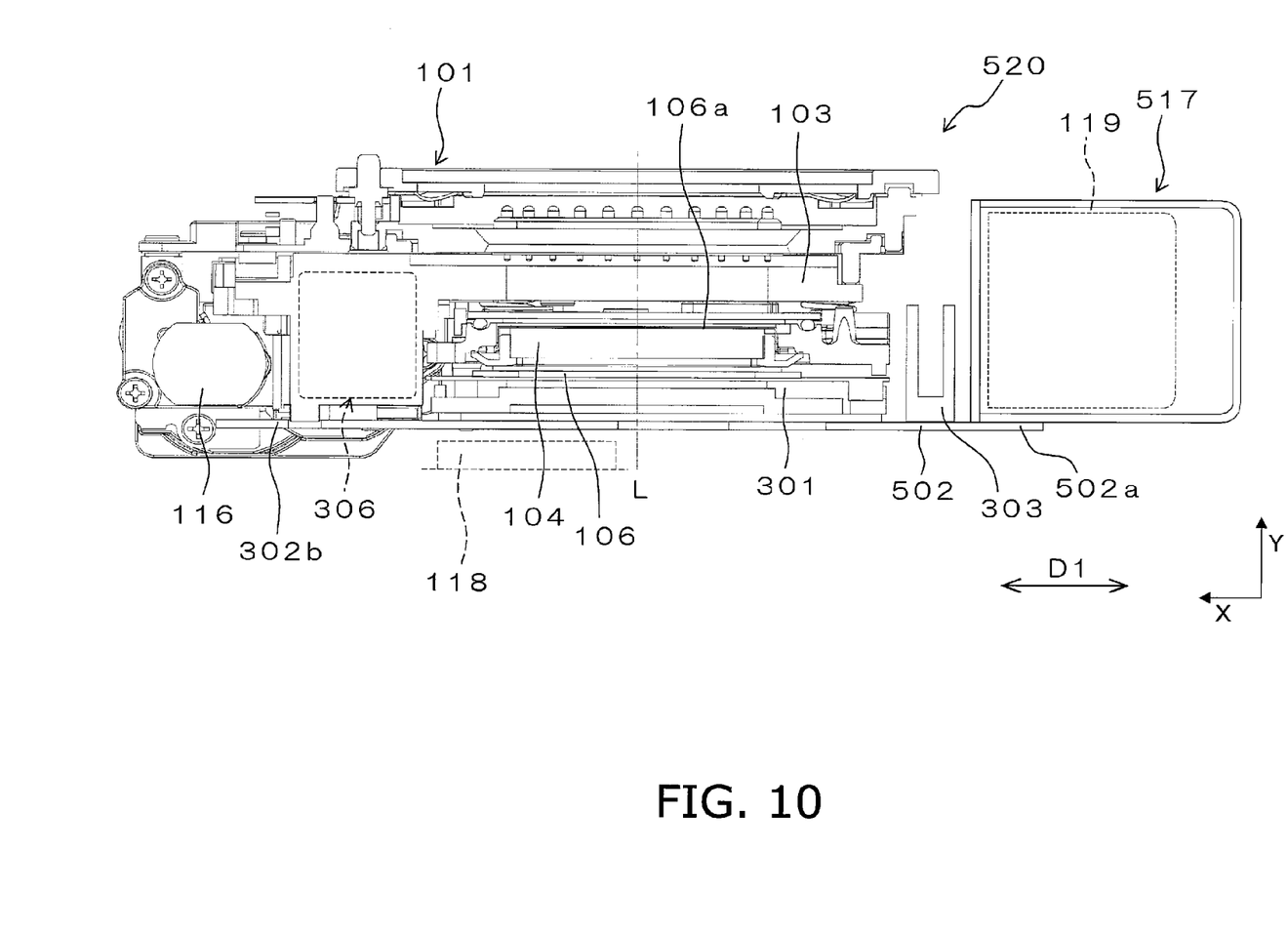
FIG. 10 is a cross section of an imaging unit (third embodiment).

Part of the heat transmitted to the second heat dissipating plate 502 is transmitted to the heat dissipating member 303 and the battery case 517, and is dissipated from the heat dissipating member 303 to the surroundings, and heat is also dissipated from the battery case 517 to the surroundings or to the interior of the battery case 517. Because the second heat dissipating plate 502 is connected to the heat dissipating member 303 and the battery case 517, heat dissipation is further promoted.

Other Embodiments

The present invention is not limited to the embodiments given above, and various changes and modifications are possible without departing from the scope of the invention.

(1) For example, the heat dissipating portion was described using the heat dissipating member 303 as an example, but the configuration of the heat dissipating portion is not limited to that of the heat dissipating member 303. The heat dissipating portion may be a fin, a battery case (corresponds to the second and third embodiments), a memory card slot, or any other member with a relatively large surface area. The heat dissipating portion may also be made up of a plurality of members. Furthermore, the heat dissipating portion may be formed integrally with the second heat dissipating plate.

(2) In the above embodiments, the first heat dissipating plate was described using the first heat dissipating plate 301 as an example, but the first heat dissipating plate is not limited to the first heat dissipating plate 301. Also, the second heat dissipating plate was described using the second heat dissipating plate 302 as an example, but the second heat dissipating plate is not limited to the second heat dissipating plate 302. For example, heat dissipation efficiency can be improved even if the thickness of the first heat dissipating plate 301 is the same as the thickness of the second heat dissipating plate 302. Also, heat dissipation efficiency can be improved even if the thickness of the first heat dissipating plate 301 is less than the thickness of the second heat dissipating plate 302.

(3) In the above embodiments, the shutter support portion was described using the shutter support portion 306 as an example, but the shutter support portion is not limited to the shutter support portion 306. For example, the shutter support portion 306 is disposed so as to be opposite the second heat dissipating plate 302, but the layout of the shutter support portion 306 is not limited to that discussed above. Also, the shutter support portion 306 is disposed at a position that is closer to the second end 302*b* than the first end 302*a*, but the layout of the shutter support portion 306 is not limited to that discussed above. Furthermore, the imaging element 106 is disposed between the heat dissipating member 303 and the shutter support portion 306 when viewed in the Z axis direction, but the layout of the shutter support portion 306 is not limited to that discussed above.

(4) In the above embodiments, the signal processor was described using the unified IC chip 118 as an example, but the signal processor is not limited to the unified IC chip 118. For example, the unified IC chip 118 is disposed so as to be opposite the second heat dissipating plate 302, but the layout of the signal processor is not limited to this. Also, the unified IC chip 118 is disposed at a position that is closer to the second end 302*b* than the first end 302*a*, but the layout of the signal processor is not limited to this.

(5) In the above embodiments, the mounting portion and the frame were described using the mount 101 and the frame 307 as examples, but the configurations of the mounting portion and the frame are not limited to those of the mount 101 and the frame 307. For example, the frame 307 and the mount 101 may be formed integrally, or the mount 101 may be attached as a separate member to the frame 307. Also, the first heat dissipating plate 301 and the second heat dissipating plate 302 may be mounted directly to the frame 307, or the first heat dissipating plate 301 and the second heat dissipating plate 302 may be mounted to the frame 307 via some other member.

(6) In the above embodiments, the heat dissipating member 303 is disposed between the battery case 117 and the imaging element 106, but the layout of the heat dissipating member 303 is not limited to this.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a heat dissipating structure and an imaging device with the heat dissipating structure. Accordingly, these terms, as utilized to describe the present invention should be interpreted relative to a heat dissipating structure and an imaging device with the heat dissipating structure.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A heat dissipating structure for an imaging unit, comprising
    an imaging element configured to convert light into an electrical signal;
    a first heat dissipating plate positioned on the rear face side of the imaging element;
    a second heat dissipating plate having a first end and a second end disposed opposite to the first end, the second heat dissipating plate being positioned on the rear face side of the first heat dissipating plate;
    a heat dissipating portion fixedly coupled to the first end of the second heat dissipating plate; and
    a shutter unit including a shutter curtain and a shutter support portion, the shutter curtain is configured to block subject light from reaching the imaging element, and the shutter support portion is arranged to face the second heat dissipating plate and configured to electromagnetically support the shutter curtain;
    wherein the imaging element has a light receiving face configured to receive light, and when viewed along a first direction parallel to the light receiving face, the imaging element is disposed between the heat dissipating portion and the shutter support portion.

2. The heat dissipating structure according to claim 1, wherein
    the thickness of the first heat dissipating plate is greater than the thickness of the second heat dissipating plate.

3. The heat dissipating structure according to claim 1, wherein
    the shutter support portion is positioned closer to the second end than the first end.

4. The heat dissipating structure according to claim 1, further comprising
    a signal processor arranged to face the second heat dissipating plate and configured to process electrical signals outputted by the imaging element.

5. The heat dissipating structure according to claim 4, wherein the signal processor is positioned closer to the second end than the first end.

6. The heat dissipating structure according to claim 1, further comprising
    a frame; and
    a mounting portion configured to releasably support an interchangeable lens, the mounting portion, the first heat dissipating plate and the second heat dissipating plate being fixedly coupled to the frame.

7. The heat dissipating structure according to claim 1, further comprising
    a battery case configured to hold a battery, wherein
    the heat dissipating portion is disposed between the battery case and the imaging element.

8. The heat dissipating structure according to claim 1, wherein
    the heat dissipating portion includes a battery case configured to hold a battery and is connected to the second heat dissipating plate.

9. The heat dissipating structure according to claim 8, wherein
    the heat dissipating portion further includes a heat dissipating member disposed between the battery case and the imaging element, the heat dissipating member is fixed to the second heat dissipating plate.

10. A heat dissipating structure for an imaging unit, comprising:
    an imaging element configured to convert light into an electrical signal;
    a first heat dissipating plate positioned on the rear face side of the imaging element;
    a second heat dissipating plate positioned on the rear face side of the first heat dissipating plate;
    a battery case connected to the second heat dissipating plate and configured to hold a battery; and
    a shutter unit including a shutter curtain and a shutter support portion, the shutter curtain is configured to block subject light from reaching the imaging element, and the shutter support portion is configured to electromagnetically support the shutter curtain;
    wherein the imaging element is disposed between the shutter support portion and the battery case.

11. The heat dissipating structure according to claim 10, wherein
    the thickness of the first heat dissipating plate is greater than the thickness of the second heat dissipating plate.

12. The heat dissipating structure according to claim 10, wherein
    the second heat dissipating plate is arranged to face the shutter support portion.

13. The heat dissipating structure according to claim 10, wherein
    the shutter support portion is positioned closer to the second end than the first end.

14. The heat dissipating structure according to claim 1, wherein
    the heat dissipating portion is a substantially U-shaped element having a lower wall portion and a pair of substantially vertical side wall portions with laterally spaced apart upper edges and lower edges coupled to lateral sides of the lower wall portion.

15. An imaging device comprising the heat dissipating structure according to claim 1.

* * * * *